(No Model.) 2 Sheets—Sheet 1.
D. C. MARKHAM.
HARROW.
No. 386,021. Patented July 10, 1888.
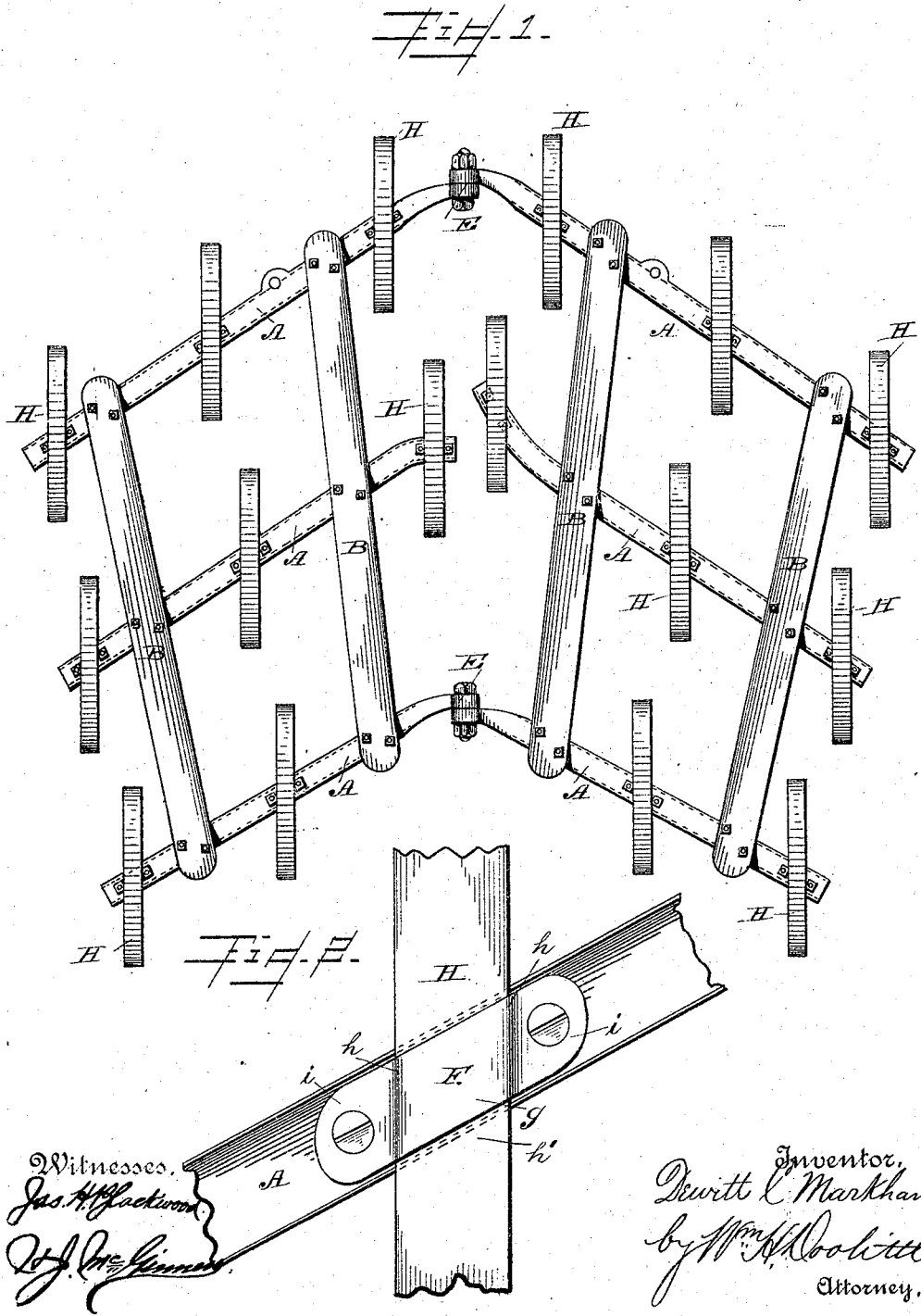

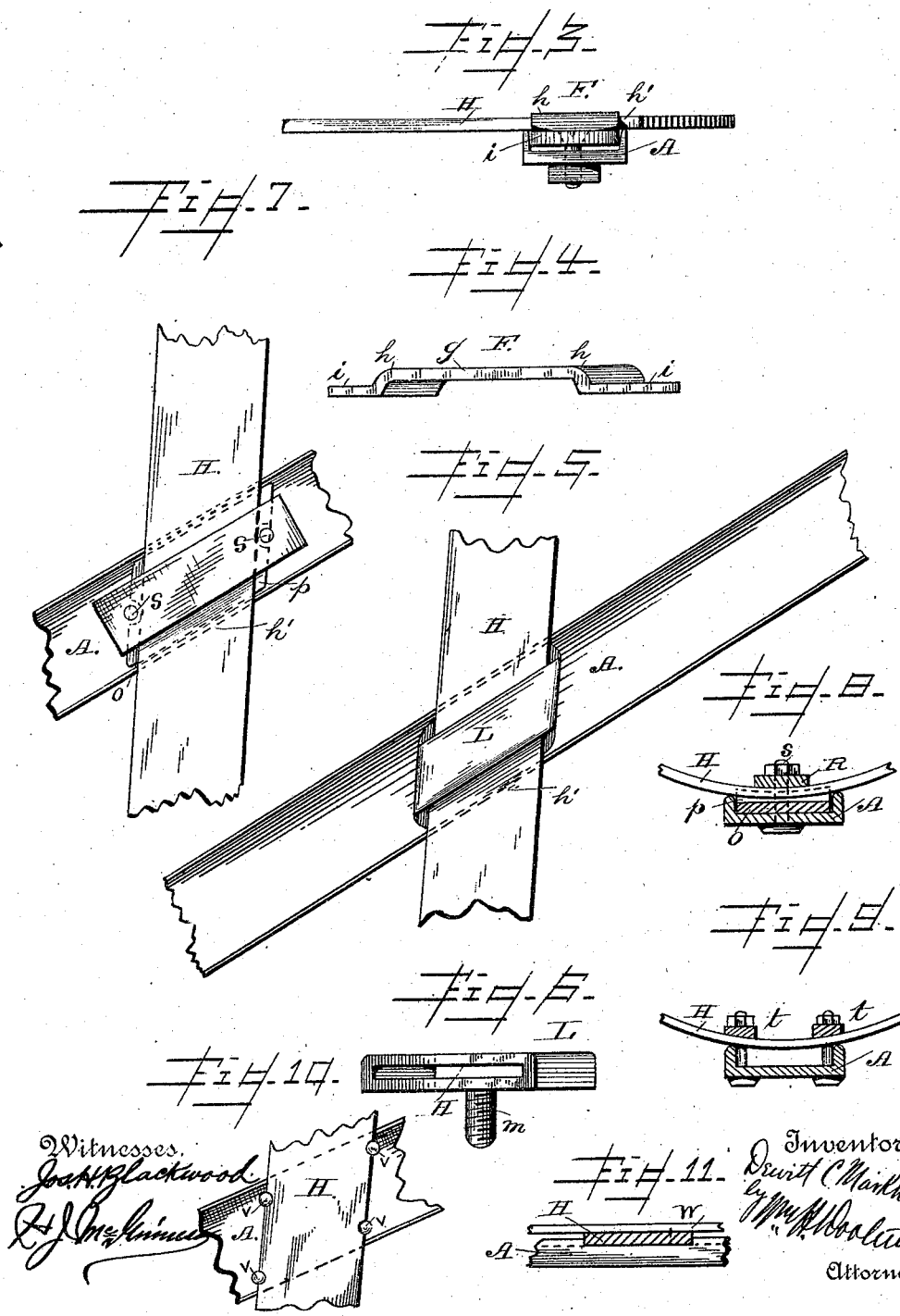

UNITED STATES PATENT OFFICE.

DEWITT C. MARKHAM, OF UTICA, NEW YORK, ASSIGNOR TO THE EUREKA MOWER COMPANY, OF SAME PLACE.

HARROW.

SPECIFICATION forming part of Letters Patent No. 386,021, dated July 10, 1888.

Application filed February 23, 1888. Serial No. 265,003. (No model.)

*To all whom it may concern:*

Be it known that I, DEWITT C. MARKHAM, a citizen of the United States, residing at Utica, in the county of Oneida and State of New York, have invented certain new and useful Improvements in Harrows; and I do hereby declare the following to be a full, clear, and exact description of the invention, such as will enable others skilled in the art to which it appertains to make and use the same.

My invention relates particularly to improvements in that class of harrows in which curved spring teeth are employed, although adapted to other forms of teeth; and it consists of novel means for fastening teeth to the frame, as hereinafter described, and particularly claimed.

Hitherto it has generally been the practice to fasten spring-curved teeth to the cross-beam at the point of intersection of the cross-beam with the draft-bar, or to a flat or curved seat formed on or secured to such beam, or to the draft-bar in connection with the cross-beam.

In my invention the tooth is not fastened to or connected with the cross beam or top surface of the frame at all, and I dispense altogether with a specially-formed seat; and in place of such constructions I fasten the tooth directly to the draft-bar at any point desired thereon by means of an adjustable clip placed between the walls of a channeled draft-bar, whereby the walls of said bar hold the clip in place and are made the seat of the tooth, and the tooth is adjusted to any point along the bar, or forward or backward, to regulate its cut, as hereinafter described.

I am also aware that it is old to construct a clip having lugs and projections, so that when the curved end of a tooth is placed on the upper surface of the cross-beam, and such clip placed thereon and bolted to the same, the said projections will bear upon the opposite edges and prevent the lateral vibration of the tooth; but one object of my invention is to so rigidly combine a draft-bar, tooth, and clip that there can be no vibration in any direction, either of the clip itself or of the tooth.

My invention is illustrated in the accompanying drawings, in which—

Figure 1 is a perspective view of a harrow with my improvement attached; Fig. 2, a plan view of a portion each of a channel draft-bar, tooth, and clip connected in accordance with my invention; Fig. 3, an end view; Fig. 4, an edge view of the clip employed; Fig. 5, a modification; Fig. 6, a detail of such modification; and Figs. 7, 8, 9, 10, and 11 are also modifications and details thereof.

Referring to the drawings, A represents the draft-bars of a harrow, which, as heretofore stated, are composed of channel-iron.

B are the cross beams placed on the upper plain surface of the channel-bars and between the points of intersection of the teeth and bars. Double-channeled or H-shaped bars may be used, if desired, without departing from my invention.

In the drawings, a V-shaped harrow is shown in two parts joined together by hinges E. These hinges are formed by making eyes in the ends of the bars, lapping the same, and putting a bolt through the eyes; or in place of separate bolts a rod might be passed through overlapping ends of the bars from one side to the other and secured thereto by nuts; or the parts may be hinged together by any other well-known device.

F is a clip or strap formed with the central span, *g*, shoulders *h*, and lugs *i*, having holes for the insertion of screw-bolts. The channel-bar is also provided with holes, through which said bolts are inserted.

H is a spring-tooth having a flat shank, *h*.

In putting the parts together the shank *h* of the tooth is laid on the walls of the bar, the clip placed over the same and lengthwise with the channel, and then the screw-bolts are put through the lugs of the clip and the channel-bar and secured tightly and held in place by nuts on the opposite side of the channel-bar.

It will be seen that by the use of this form of clip bearing on the shank of the tooth the ends of the clip are held above the bottom of the channel, even when screwed down tightly, leaving a space between the lugs and the channel-bottom. This space thus affords opportunity for additional tightening of the clip when the parts become worn.

It will also be seen that the sides of the clip rest between the walls of the channel-bar, and are thereby held from turning, and that lateral vibration of the tooth-shank is prevented by the opposite shoulder of the clip.

L is a modification of the clip, consisting of an entire span, the bottom piece of which is provided with a screw-shank, m, which may be put through a hole in the bar and the same tightened against the bar by a nut, as shown in Figs. 5 and 6.

Holes may be put at any place along the channel-bar, so as to fix the teeth at any desired position on the draft-bar, and as near together as desired, so as to secure a thorough pulverization of the soil. The position of the clip thus not depending on the intersection of the cross-beam and draft-bar, the cross-beams are only used to connect and stiffen the draft-bars in making the frame, and as few cross-beams as are simply necessary for this purpose are therefore used, two being sufficient in some cases. Economy in the use of cross bars is thus attained. Wood or metal cross-beams may be employed.

The modification shown in Figs. 7 and 8 consists of a clip in two parts—a bottom plate, o, provided with ledges p and placed within the walls of the channel-bar, and a top plate, R. The shank of the tooth rests on the channel-bar, the ledges p embrace its sides, while screws S are used to connect the top and bottom plates, and thus hold the parts securely together and in place.

Fig. 9 shows a double clip, composed of the two plates t t, with the tooth-shank resting on the channel-walls, the plates t t on the tooth, and screw-bolts t', employed to fasten the tooth-shank securely to the channel-iron, said bolts passing through the iron and abutting against its walls, as shown, to prevent lateral motion.

Fig. 10 shows four pins, v, put through the web of the channel-iron with their tops engaging the edges of the tooth, which answers the same purpose as a clip-plate.

Fig. 11 shows the tooth let into the flanges of the channel, with a straight clip, w, on top, to be held by screw-bolts.

It will be noticed that the clip is not only adjustable but reversible—that is, if double channel-iron is used the clip can be put on either the top or bottom channel and the tooth fastened either to the top or bottom of the draft-bar.

It will also be noticed that I do not confine myself to a particular form of harrow, clip, or tooth, and that no special adaptation or form of seat is necessary, except the walls of the channel-bar.

What I claim is—

1. In a harrow, the combination, with a channel draft-bar having its walls placed vertically, of a tooth mounted on the plain edges of said walls, and a clip to hold said tooth firmly in such position, substantially as described.

2. In a harrow, the combination of the channel draft-bar having its walls placed vertically, a tooth mounted on the plain edges of said walls, and a clip extending over said tooth and confined by the walls of said bar, substantially as described.

3. In combination with a harrow-tooth, the tooth-clip formed with the central span, g, shoulder h, and lugs i, and a channeled bar, the said central span, g, extending above the walls of said bar, so as to accommodate and hold the shank of the tooth placed on the said walls, and the said lugs extending between the walls of the bar, substantially as described.

4. In a harrow, the combination of the channel draft-bar, the tooth mounted on the plain edges of said bar, and the clip mounted on and spanning the tooth and held by said tooth above the bottom of the channel, whereby the said clip acts upon the said tooth above the channel-bar, substantially as and for the purpose described.

In testimony whereof I affix my signature in presence of two witnesses.

DEWITT C. MARKHAM.

Witnesses:
C. L. WILLIAMS,
M. W. ROSS.